United States Patent [19]

Stewart et al.

[11] 3,846,703

[45] Nov. 5, 1974

[54] NOISE CONTROL SYSTEM FOR TRANSMISSION NETWORK

[75] Inventors: Floyd C. Stewart, Phoenix, Ariz.; Daniel W. Weeks, Irving; Brian E. Belcher, Dallas, both of Tex.

[73] Assignee: TOCOM Inc., Irving, Tex.

[22] Filed: Feb. 28, 1973

[21] Appl. No.: 336,618

[52] U.S. Cl. ................ 325/53, 178/3, 178/DIG. 13, 325/31

[51] Int. Cl. ........................................... H04b 1/00

[58] Field of Search ..... 330/51; 340/147 T, 147 LP, 340/151, 167, 171; 178/2, 3, 70 R, DIG. 13, 5.4 TE; 179/170.2, 170 E, 2 AS, 15 R, 15 BM; 325/31, 51–55, 62–65, 67, 308, 309, 363; 328/103, 165

[56] References Cited

UNITED STATES PATENTS

| | | | |
|---|---|---|---|
| 2,428,520 | 10/1947 | Herrick | 179/170 E |
| 2,521,752 | 9/1950 | Schwarz | 330/51 |
| 3,374,309 | 3/1968 | Elich et al. | 178/3 |
| 3,564,499 | 2/1971 | Ryan | 178/3 |
| 3,647,966 | 3/1972 | Teurnier | 178/70 R |
| 3,750,022 | 7/1973 | Curry et al. | 325/53 |
| 3,786,424 | 1/1974 | McVoy et al. | 340/151 |

*Primary Examiner*—Thomas A. Robinson
*Attorney, Agent, or Firm*—Clegg, Cantrell & Crisman

[57] ABSTRACT

Disclosed is a noise control system especially useful in branching or fan-out type transmission networks which include a primary trunk cable and a plurality of feeder cables branching therefrom at various points along the trunk cable. Amplifiers are coupled to at least some of the feeder cables. The system includes a plurality of control units each connected to a different one of the amplifiers and to the feeder cable in which such amplifier is located. The control unit responds to certain signals transmitted over the feeder cable to which it is connected by enabling operation of the amplifier to which it is connected. The control unit responds to the removal of signals from the feeder cable or to the transmission thereover of other signals by disabling the operation of the amplifier to which it is connected. In this manner, noise from certain feeder cables in which the corresponding amplifier is disabled is prevented from reaching the trunk cable.

19 Claims, 4 Drawing Figures

NOISE CONTROL SYSTEM FOR TRANSMISSION NETWORK

BACKGROUND OF THE INVENTION

This invention relates to a noise control arrangement for transmission networks and more particularly to an arrangement which is especially useful in branching bi-directional transmission networks.

In community antenna or cable television distribution systems, television program signals are distributed from a central station to various subscribers by way of a coaxial cable. Partly because of the increased popularity of such systems, a number of proposals have been made for utilizing the systems for transmitting various information and data signals between the subscriber's location and the central station in addition to the normal television signal transmission. With such bi-directional transmission, fire alarm signals, burglar alarm signals, ambulance summoning signals, water meter, gas meter and electric meter reading signals, viewer response signals, etc. could be transmitted from the subscriber's location to the central station for processing. In co-pending application, Ser. No. 220,984, filed Jan. 26, 1972, such a bi-directional cable television system designed for such other uses is described.

In a cable system of the type referred to, the transmission network fans or branches out from the central station to the various subscriber locations. For example, signals from the central station are transmitted along a trunk through a series of amplifier and distribution units. At each amplifier and distribution unit, the signal would be transmitted in several directions over feeder cables, some of which would, in turn, include one or more amplifiers. Each feeder cable transmits the signal to a plurality of subscriber units connected to the feeder cable. A signal transmitted from the central station to a particular subscriber unit would thus pass through a certain number of amplifiers before reaching the subscriber unit, but this number would be far less than the total number of amplifiers in the system. The accumulation of noise from each amplifier through which the signal passes would not be so severe as to cause a significant degradation of the signal when it reached the subscriber unit. In the return direction, however, i.e., transmitting from a subscriber unit to the central station, all amplifiers in the system, if operating, could conceivably contribute noise to a signal being transmitted from the subscriber unit to the central station. It is apparent that with such noise, the signal arriving at the central station could easily be degraded to the point where it could not be detected or decoded.

It is an object of the present invention to provide a noise control system which is especially useful in a branching or fan-out type transmission network.

It is another object of the present invention to provide for automatically controlling the operation of the transmission line amplifiers in a transmission network so as to minimize the noise contributed by or passing through such amplifiers.

It is still another object of the present invention to provide a noise control system in which the operation of such transmission line amplifiers is controlled by signals transmitted on the transmission lines of the network.

BRIEF DESCRIPTION OF THE DRAWINGS

For a better understanding of the present invention, together with other and further objects and features thereof, reference is had to the following description taken in connection with the accompanying drawings described as follows.

DETAILED DESCRIPTION

Figure 1:
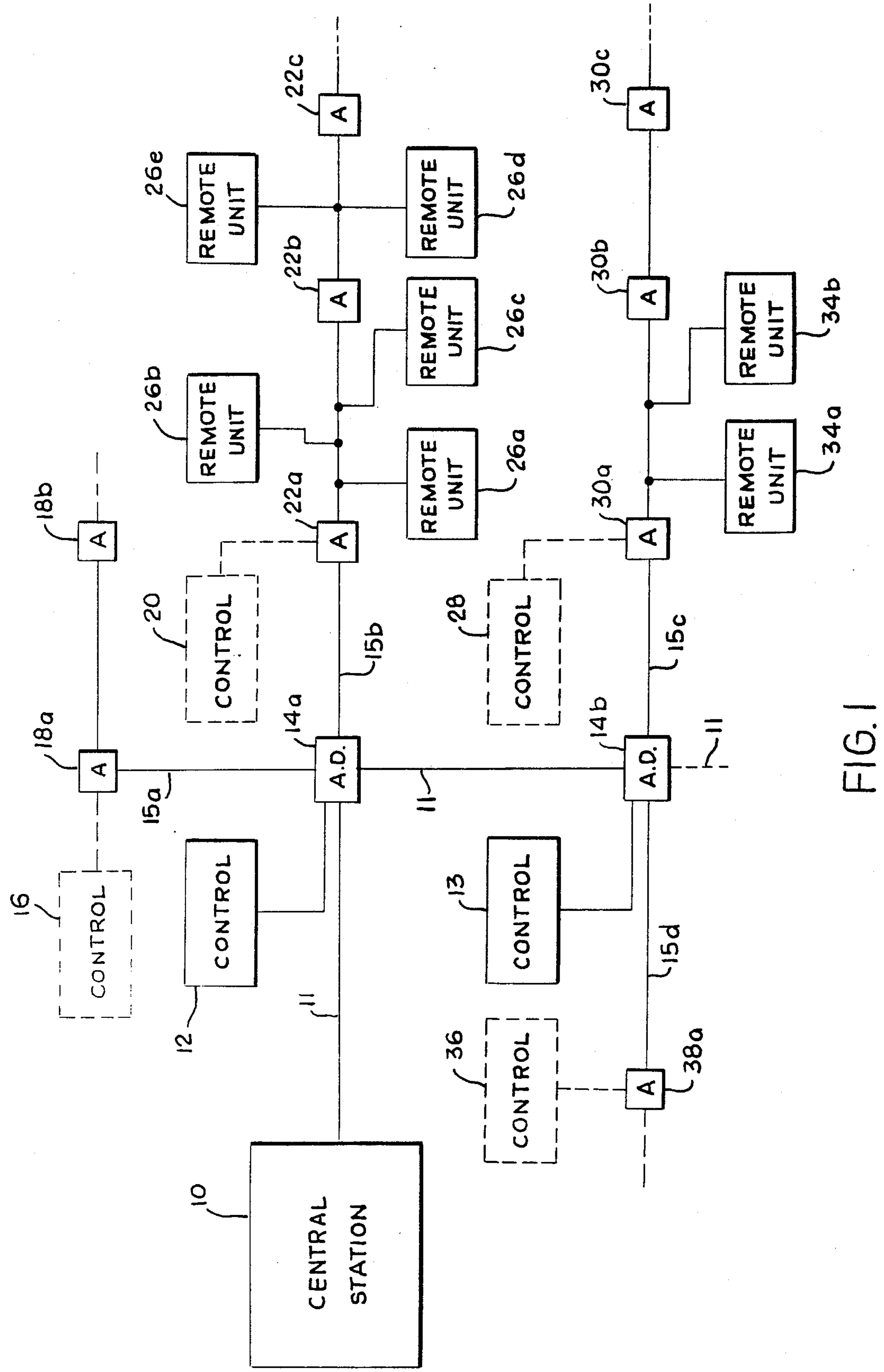
FIG. 1 is an overall system block diagram of one illustrative embodiment of the present invention.

Referring to FIG. 1, there is shown a central station 10 connected to a plurality of remote subscriber units 26*a*, 26*b*, 26*c*, etc. 34*a*, 34*b*, etc. by way of a coaxial cable network or signal distribution system. The cable distribution system includes a coaxial type trunk cable 11 having various bi-directional trunk amplifier and distribution units 14*a*, 14*b*, etc. connected at spaced points therealong. Coaxial-type feeder cables 15*a*, 15*b*, 15*c*, etc. extend outwardly from respective ones of the amplifier and distribution units 14*a*, 14*b*, etc. Remote units 26*a*, 26*b*, 26*c*, etc. are connected to feeder cable 15*b*; remote units 34*a*, 34*b*, etc. are connected to feeder cable 15*c*; and similar remote units are connected (but not shown) to feeder cables 15*a*, 15*d*, etc. Various bi-directional amplifiers 18*a*, 18*b*, etc. 22*a*, 22*b*, etc., 30*a*, 30*b*, and so on are located at spaced points along feeder cables 15*a*, 15*b*, 15*c*, etc., respectively. Of course, some feeder cables may not have such bi-directional amplifiers if the same are not needed.

Except for the presence of control units, the FIG. 1 system is basically the same as shown and described in the aforecited co-pending application. In such system, the central station 10 may transmit a data signal sequence which identifies a particular remote unit from which information is desired and the type of information desired. The particular remote unit then, in response to this data signal sequence, transmits the requested information to the central station 10.

As can be seen from FIG. 1, the distribution system is a type of fan-out or branching transmission network in which a plurality of feeder cables 15 branch from a primary or trunk cable 11. Signals generated by the central station 10 are applied to the trunk cable 11 and transmitted thereover via the amplifier and distribution units 14 to the various feeder cables 15 and then to the remote units. This direction of transmission will hereafter be referred to as the forward direction. A signal arriving at a remote unit will have beem amplified by one or more of the amplifier and distribution units 14 and by one or more of the amplifiers positioned in the feeder cable to which the remote unit is connected. At each stage of amplification, as well as along the trunk cable 11 and the various feeder cables, noise can be introduced into the transmission network and such noise may be amplified at the next succeeding stage of amplification. The accumulated noise reaching a remote unit, however, will typically not be sufficient to seriously degrade any transmitted signals.

Transmission in the return direction, i.e., from the remote unit to the central station 10, however, can pose problems not confronted with forward transmission.

For example, if each of the amplifiers in the feeder cables 15 contributed some noise which was passed along its corresponding feeder cable toward the central station, the amount of such noise could accumulate to the point where it would seriously degrade any signal being transmitted from a remote unit to the central station 10. In such case, of course, the number of such "noise contributions" could equal the number of amplifiers in the distribution system.

For a first system embodiment, control units 12 and 13 are connected to respective ones of the amplifier and distribution units for controlling the operation of certain amplifiers contained therein which amplify signals being transmitted in the return direction (hereinafter referred to as return amplifiers--as opposed to forward amplifiers which amplify signals being transmitted in the forward direction). The control units 16, 20, 28 and 36, shown in dotted outline, are not part of this first embodiment to be described, and should be considered as not being connected in the FIG. 1 system.

Each control unit 12 and 13 responds to certain signals or conditions on the distribution network by turning on a return amplifier in the associated amplifier and distribution unit and responds to certain other signals or conditions on the network by turning off the return amplifier. When such return amplifier is turned off, the noise which might otherwise be contributed by it and by any other return amplifier in any of the feeder cables connected to the corresponding amplifier and distribution unit is eliminated. Thus, by appropriately signalling the control units, the noise from most feeder cables not having a transmitting remote unit can be eliminated.

Assume, for example, that the central station 10 has identified remote unit 26*d* and has requested certain information from the unit. In such a case, control unit 12 would enable a return amplifier in the amplifier and distribution unit 14*a* to operate; and control unit 13 (and other control units connected to amplifier and distribution units not shown) would maintain disabled the return amplifier in the amplifier and distribution unit 14*b* (and the return amplifiers in the corresponding amplifier and distribution units not shown). The only feeder cable amplifiers thus contributing noise to the system would be the amplifiers 22*a*, 22*b*, 22*c*, etc. and 18*a*, 18*b*, etc.

Figure 2:
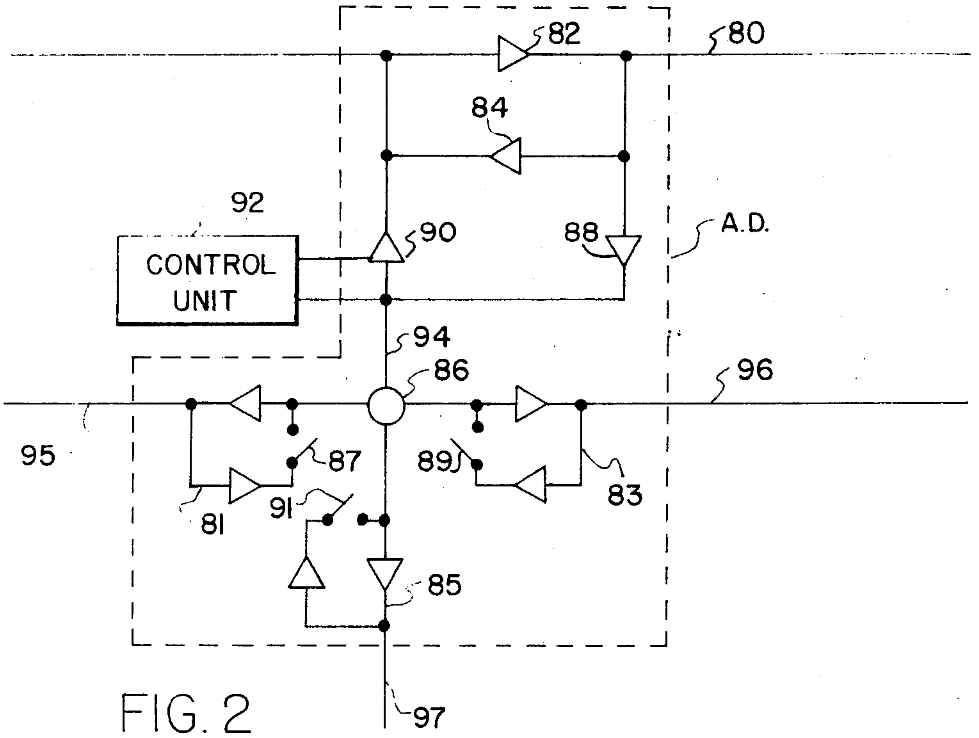
FIG. 2 shows one illustrative embodiment of the amplifier and distribution units of FIG. 1.

To further clarify the operation of the first embodiment here being described, attention is directed to FIG. 2 which shows an illustrative arrangement of the amplifier and distribution units of FIG. 1. The amplifier and distribution unit of FIG. 2 includes trunk cable 80, forward amplifier 82 and return amplifier 84. Coupling the trunk cable 80 to a feeder branching isolation network 86 are feeder cable forward amplifier 88 and return amplifier 90. A control unit 92 is coupled to the return amplifier 90 and to a feeder connection cable 94. Feeder cables 95, 96 and 97 branch from the isolation network 86.

Signals transmitted from the central station travel via amplifier 82 and amplifier 88 to the isolation network 86 and from there over the feeder cables 95, 96, and 97. Signals transmitted from a remote unit connected to one of the feeder cables 95, 96 or 97 travel via the isolation network 86, the feeder cable return amplifier 90 to the trunk cable 80. The isolation network 86 passes signals from each of the feeder cables 95, 96 and 97 to the feeder connection cable 94 but prevents signals from passing from any feeder cable to any other feeder cable. Such networks are well-known in the art. The control unit 92 detects certain signals or conditions on the feeder connection cable 94 and either enables or disables operation of the return amplifier 90 depending on the signal or condition detected. If the return amplifier 90 is disabled, then all noise on feeder cables 95, 96 and 97 in the return direction is prevented from reaching the trunk cable 80. If the return amplifier 90 is enabled, then noise from the feeder cables 95, 96 and 97 can reach the trunk cable 80.

It it were desired to eliminate even more noise, then amplifier pairs 81, 83 and 85, coupled in circuit in feeder cables 95, 96 and 97 respectively, could be provided together with manually operable switches 87, 89 and 91. Then, in order to eliminate even more noise from reaching trunk cable 80 when the return amplifier 90 were enabled, the switches in the two feeder cables not connected to the transmitting remote unit could be manually opened. For example, assume that feeder cable 96 was connected to a transmitting remote unit and that control unit 92 has enabled the return amplifier 90 to amplify the signals transmitted by the remote unit. In this case, manually opening switches 87 and 91 would prevent noise from feeder cables 95 and 97 respectively from reaching the trunk cable 80. After the remote unit had completed transmission, switches 87 and 91 could again be closed in anticipation of further command signals from the central station.

A second illustrative system embodiment utilizes the control units 16, 20, 28, 36, etc. shown in dotted lines in FIG. 1 and not the control units 12 and 13. This embodiment will be discussed with respect to FIG. 1 assuming that the control units 12 and 13 are not present in FIG. 1 and that control units 16, 20, 28, 36, etc. are connected to respective ones of the feeder cable bi-directional amplifiers 18*a*, 22*a*, 30*a*, 38*a*, etc. Each such bi-directional amplifier includes a forward amplifier and a return amplifier, the latter of which is connected to a corresponding control unit. As in the first described embodiment, each control unit 16, 20, 28, 36, etc. responds to certain signals or conditions on the distribution network by enabling or turning on its associated return amplifier and responds to certain other signals or conditions by disabling or turning off the return amplifier. The only feeder cable return amplifiers so controlled are those located at the front end of a feeder cable, i.e., that one in a feeder cable nearest the associated trunk amplifier and distribution unit. When one such return amplifier is turned off, the return noise from the associated feeder cable is eliminated. With this embodiment, it is possible to eliminate the return noise of all feeder cables except the ones in which transmitting remote units are located. The "front end" return amplifiers in the feeder cables having the transmitting remote units would, of course, be turned on to enable transmission of signals from the remote units to the central station.

It might be noted here that for the second described system embodiment, the amplifier and distribution units of the system could be of simpler construction than shown in FIG. 2, with the amplifiers 90 and 88 or the amplifier pairs 81, 83 and 85 being eliminated.

Then, the isolation network 86 would be connected directly to the trunk cable 80 on the right side of the forward amplifier 82.

Figure 3:
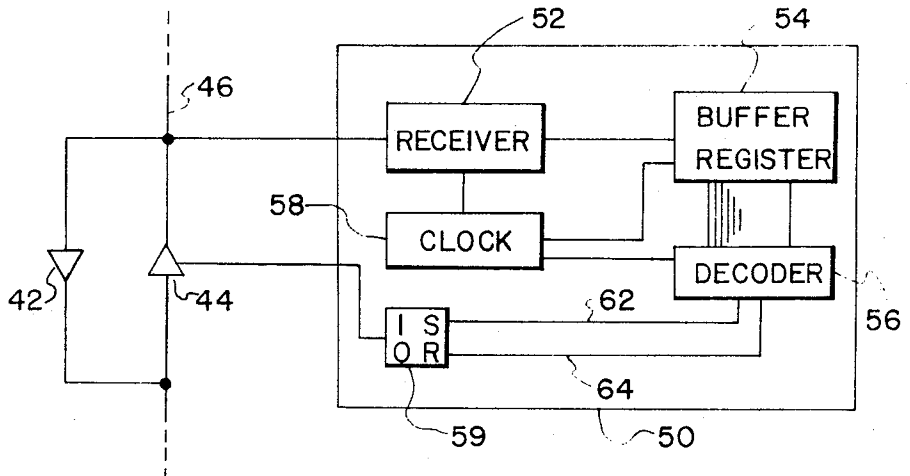
FIG. 3 shows one illustrative embodiment of the control units of FIGS. 1 and 2.
Figure 4:
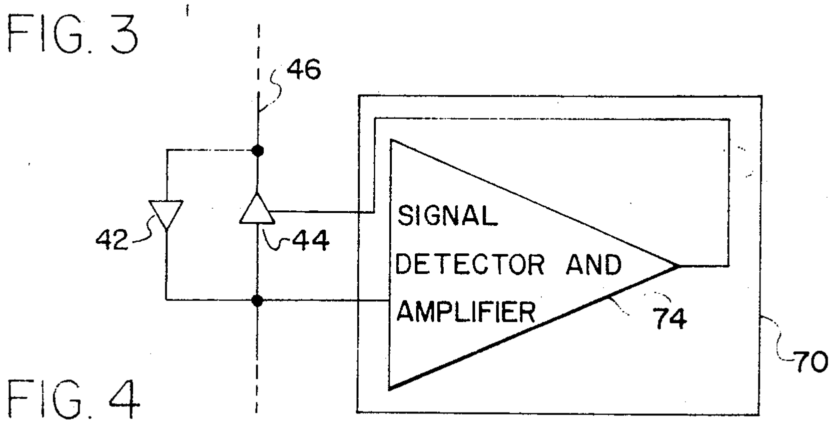
FIG. 4 shows another illustrative embodiment of the control units of FIGS. 1 and 2.

FIGS. 3 and 4 show two different illustrative embodiments of the control units of FIGS. 1 and 2 for use in either the first or second described system embodiments. FIG. 3 shows a control unit 50, a forward amplifier 42 and a return amplifier 44. The control unit 50 is connected to a feeder cable 46 on the "upstream" side of the amplifiers 42 and 44, i.e., on the side connected via the feeder cable to the associated trunk amplifier and distribution unit. The control unit 50 is also connected to the return amplifier 44.

The control unit 50 includes a receiver 52 connected to a buffer register 54 which, in turn, is connected to a decoder 56 and to a clock 58. The clock 58 is also connected to the receiver 52 and to the decoder 56. The decoder 56 is connected to a flip-flop 59, the output of which is connected to the return amplifier 44.

Data signals generated by the central station 10 and applied to feeder cable 46 are received by the receiver 52. Such data signals, as described earlier, identify a particular remote unit or remote units from which a response or responses are desired. Upon receipt of such data signals, the receiver 52 signals the clock 58 to commence generating timing pulses and applies the data signals to the buffer register 54 where they are temporarily stored. After the data signals have been received and registered, the clock 58 signals the buffer register 54 to apply the signals in parallel to the decoder 56. If any one of a predetermined group of data signal sequences is received, the decoder 56 applies a signal via lead 62 to "set" the flip-flop 59. Upon setting the flip-flop 59, the flip-flop applied a signal to the return amplifier 44 enabling or turning on the amplifier. The return amplifier 44 is thus conditioned to amplify signals from "downstream" remote units and transmit them on toward the central station.

The decoder 56 is designed to set the flip-flop 59 when a data signal sequence is received by it which identifies a remote unit connected to the feeder cable 46. That is, when the central station 10 generates a remote unit identification signal sequence which identifies some remote unit connected to the feeder cable 46, the decoder 56 responds by setting the flip-flop 59 which, in turn, enables or turns on the return amplifier 44.

After completion of transmission by the remote unit connected to feeder cable 46, the central station transmits another data signal sequence which is received and registered by the control unit 50. This sequence is decoded by the decoder 56 which then applies a signal to lead 64 "resetting" the flip-flop 59 to thereby terminate application of the enabling signal to the return amplifier 44. The return amplifier 44 is thus disabled or turned off. An alternative arrangement for turning off the amplifier 44 would be to reset the flip-flop 59, not immediately after completion of transmission by the remote unit, but rather in response to receipt of the next remote unit identifying signal sequence. Thus, if a data signal sequence is received by the control unit 50 which does not identify one of the remote units connected to the feeder cable 46, the decoder 56 would apply a "resetting" signal to the flip-flop 59 to turn off the return amplifier 44.

In the manner described, the control unit 50 responds to certain data signals sent out in the forward direction by the central station 10 by turning on the return amplifier 44, and responds to certain other data signals by turning off the return amplifier.

FIG. 4 shows an illustrative control unit which responds to signals generated by a remote unit located "downstream" from the control unit. In this arrangement, a control unit 70 is connected to the return amplifier 44 and also to the feeder cable 46 on the "downstream" side of the amplifier. The control unit 70 includes a signal detector and amplifier 74 connected to the feeder cable 46 and to the return amplifier 44. The detector and amplifier 74 is tuned to respond to signals within a certain frequency range generated by the remote units attached to feeder cable 46 by applying an enabling signal to the return amplifier 44. Thus, when a remote unit attached to the feeder cable 46 responds to a request for information from the central station 10, the detector and amplifier 74 detects the signal generated by the remote unit (illustratively the carrier frequency used by the remote unit) and signals the return amplifier 44 to turn on the amplifier. Assuming that none of the other remote units in the system were transmitting at this time, the control units of the other feeder cables would each maintain a corresponding return amplifier in a disabled condition so that only the amplifiers of feeder cable 46 would contribute to the accumulated noise. (It should be noted here that the system of FIG. 1 could be designed so that two or more remote units could transmit simultaneously using different signalling frequencies in which case the amplifiers in more than one feeder cable would contribute to the accumulated noise.) When the remote unit in question ceases transmitting, the detector 74 removes the enabling signal from the return amplifier 44 to turn it off.

For the FIG. 4 embodiment, all return amplifiers connected to control units are normally "off" until some remote unit commences to transmit. When this occurs, the return amplifier connected in the feeder cable in which such remote unit is located is turned on during such transmission; and after the transmission is completed, the return amplifier is again turned off.

The illustrative control units of FIGS. 3 and 4 were both automatically actuated by signals transmitted over the distribution network. The control units of the system could, of course, be manually actuated or could comprise a simple switch (such as the switches 87, 89 and 91 of FIG. 2) whereby opening the switch would disconnect the corresponding return amplifier from its associated feeder cable and closing the switch would connect it to its associated feeder cable.

Although the control units of FIGS. 3 and 4 were described as connected to feeder cable return amplifiers in accordance with the second described system embodiment, the control units would operate in the same manner in the first described system embodiment connected as shown in FIG. 2.

It is to be understood that the above-described embodiments are only illustrative of the principles of the present invention. Other embodiments may be described by those skilled in the art without departing from the spirit and scope of the invention and the appended claims are intended to cover such embodiments.

What is claimed is:

1. In a two-way, broad-band, high frequency coaxial communications system, a central transmitting and receiving unit, a plurality of remote transmitting and receiving units, a primary coaxial trunk line connected to said central unit, a plurality of coaxial feeder lines each connected to one or more of said remote units, means connecting said feeder lines to said trunk line at spaced points therealong to establish signal transmission paths between said central unit and said remote units, a plurality of bi-directional amplifier means interposed at selected points in said transmission paths, each including a forward amplifier for amplifying signals transmitted downstream from said central unit to one or more selected remote units and a return amplifier for amplifying signals transmitted upstream from one or more remote units to said central unit, and a control means including:

means for normally disabling selected ones of said return amplifiers sufficient to block the upstream signal paths from all of said remote units;

means for sensing an upstream transmission from a remote unit having a disabled return amplifier in its upstream signal path;

means for enabling each return amplifier in said upstream signal path of said transmitting remote unit in response to a predetermined signal characteristic of said upstream transmission; and means for disabling each said enabled return amplifier when said transmitting remote unit ceases transmission.

2. The combination set forth in claim 1 wherein each of said normally disabled return amplifiers blocks the upstream signal paths of all of the remote units connected to a selected feeder line.

3. The combination set forth in claim 2 wherein each of said normally disabled return amplifiers blocks the upstream signal paths of all of the remote units associated with at least one additional selected feeder line.

4. The combination set forth in claim 1 wherein said control means includes a control unit associated with each of said selected normally disabled return amplifiers for controlling said associated amplifier, said control unit comprising:

a signal detector and amplifier means having an input connected to the input of a controlled amplifier and an output connected to said controlled amplifier for normally disabling said controlled amplifier and for sensing an upstream transmission to said controlled amplifier to deliver an output enabling signal to said amplifier in response to said predetermined signal characteristic of said sensed upstream transmission.

5. The combination set forth in claim 4 wherein said predetermined signal characteristic occurs in a predetermined frequency range and said control unit is tuned to respond to upstream transmissions within said predetermined frequency range.

6. The combination set forth in claim 1 wherein said means for connecting said feeder lines to said trunk line includes:

at least one isolation network having a plurality of coaxial terminals, wherein signals delivered to one of said terminals is transmitted to the remainder of said terminals and signals delivered to said remainder of said terminals are transmitted only to said one terminal; and a like plurality of bi-directional amplifier means, each including a forward amplifier and a return amplifier, one of said bi-directional amplifiers connecting said one terminal of said isolation network to said trunk line and said remainder of said bi-directional amplifier means each connecting one of said remaining terminals to a feeder line.

7. The combination set forth in claim 6 wherein said selected return amplifiers comprise the return amplifier of each bi-directional amplifier means connecting each isolation network to said trunk line.

8. The combination set forth in claim 6 wherein said selected return amplifiers comprise the return amplifier of each bi-directional amplifier means connecting each isolation network to a feeder line.

9. In a two-way, broad-band, high frequency coaxial communications system, a central transmitting and receiving unit, a plurality of remote transmitting and receiving units, a primary coaxial trunk line connected to said central unit, a plurality of coaxial feeder lines, each connected to one or more of said remote units, at least one isolation network having a plurality of coaxial terminals wherein signals delivered to one of said terminals are transmitted to the remainder of said terminals and signals delivered to said remaining terminals are transmitted only to said one terminal, a plurality of bi-directional amplifier means, each including a forward amplifier for amplifying signals transmitted downstream from said central unit to one or more selected remote units and a return amplifier for amplifying signals transmitted upstream from one or more of said remote units to said central unit for connecting said one terminal of each isolation network to said trunk line and for connecting said remaining terminals of each isolation network to said feeder lines, and a control unit for controlling selected ones of said bi-directional amplifier means, said control unit comprising:

a receiver for serially receiving downstream data signals applied to said controlled bi-directional amplifier means identifying a selected remote unit for subsequent upstream transmission therefrom;

a buffer register coupled to said receiver for accepting and storing signals and having a parallel coded output;

decoder means coupled to the output of said buffer register for generating a first signal in response to a coded output from said buffer register identifying a remote unit in the signal path of said controlled bi-directional amplifier means and for generating a second signal in response to a coded output from said buffer register not identifying a remote unit in said signal path;

clock means coupled to said receiver for generating timing pulses when said receiver receives a downstream transmission;

means for applying said timing pulses to said buffer register to enable said buffer register to accept and store said downstream signals from said receiver and for applying said stored signals to said decoder means; and a flip-flop connected between said decoder means and the return amplifier of said controlled bi-directional amplifier means for enabling said return amplifier in response to said first generated decoder signal and for disabling said return amplifier in response to said second generated decoder signal.

10. The combination set forth in claim 9 wherein a downstream transmission immediately following an upstream transmission from said selected remote unit generates a non-identifying coded output from said buffer register.

11. A control means for minimizing noise in a two-way, broad-band, high frequency, communications system of the type including a central transmitting and receiving unit, a plurality of remote transmitting and receiving units, a primary coaxial trunk line connected to the central unit, coaxial feeder lines connected to one or more remote units, distributing means at selected points along the trunk line for selectively coupling two or more feeder lines to the trunk line at each selected point to establish signal transmission paths between said central and remote units, a plurality of bi-directional amplifier means interposed in said paths each including a forward amplifier for amplifying signals transmitted downstream from the central unit to one or more selected remote units and a return amplifier for amplifying signals transmitted upstream from one or more selected remote units to the central unit, said control means comprising:

means for normally disabling a selected one of the return amplifiers;

means for sensing an upstream transmission from a remote unit in the signal path of said disabled return amplifier;

means for enabling said return amplifier in response to a predetermined signal characteristic of the upstream transmission; and means for disabling said return amplifier when the remote unit associated therewith ceases transmission.

12. A control means according to claim 11 wherein said control means includes a signal detector and amplifier means having an input connected to the input of a controlled return amplifier and an output connected to said controlled return amplifier for delivering an enabling signal thereto in response to said predetermined signal characteristic of said sensed upstream transmission.

13. A control means according to claim 12 wherein said predetermined signal characteristic occurs in a predetermined frequency range and said detector and amplifier means is tuned to respond to only those upstream transmission signals within said predetermined frequency range.

14. A control means according to claim 13 wherein the controlled return amplifier forms part of a distributing means.

15. A control means according to claim 13 wherein a controlled return amplifier is connected in a feeder line.

16. A control means according to claim 15 wherein the controlled return amplifier is the feeder line return amplifier nearest the distribution means coupling the feeder line to the trunk line.

17. A method of minimizing noise in a two-way broad-band, high frequency, coaxial communications system of the type including a central transmitting and receiving unit and a plurality of remote transmitting and receiving units, a primary coaxial trunk line connected to the central unit, a plurality of coaxial feeder lines, each connected to one or more remote units, distributing means located at selected points along said trunk line for selectively coupling said feeder lines to said trunk line at said selected points for establishing signal transmission paths between said control unit and said remote units, bi-directional amplifier means interposed at selected points in said transmission paths including a forward amplifier for amplifying signals transmitted downstream from said central unit to one or more selected remote units and a return amplifier for amplifying signals transmitted upstream from one or more selected remote units to the central unit, which comprises the steps of:

normally disabling a sufficient number of the return amplifiers to block the upstream signal paths between the central unit and all of the remote units;

selectively enabling each normally disabled return amplifier in the upstream signal path between a selected remote unit and the central unit to permit an upstream transmission from the selected remote unit; and disabling each selectively enabled return amplifier when the selected remote unit ceases transmission.

18. The method set forth in claim 17 wherein a disabled return amplifier is selectively enabled in response to a downstream transmission.

19. The method set forth in claim 17 wherein a disabled return amplifier is selectively enabled in response to an upstream transmission.

* * * * *